United States Patent
Allen et al.

(10) Patent No.: US 10,288,792 B2
(45) Date of Patent: May 14, 2019

(54) LASER FEATURED GLASS FOR DISPLAY ILLUMINATION

(71) Applicant: CORNING INCORPORATED, Corning, NY (US)

(72) Inventors: Kirk Richard Allen, Elmira, NY (US); Daniel Ralph Harvey, Beaver Dams, NY (US); Vasudha Ravichandran, Painted Post, NY (US)

(73) Assignee: Corning Incorporated, Corning, NY (US)

(*) Notice: Subject to any disclaimer, the term of this patent is extended or adjusted under 35 U.S.C. 154(b) by 141 days.

(21) Appl. No.: 15/114,675

(22) PCT Filed: Jan. 29, 2015

(86) PCT No.: PCT/US2015/013390
§ 371 (c)(1),
(2) Date: Jul. 27, 2016

(87) PCT Pub. No.: WO2015/116743
PCT Pub. Date: Aug. 6, 2015

(65) Prior Publication Data
US 2016/0349440 A1    Dec. 1, 2016

Related U.S. Application Data

(60) Provisional application No. 61/933,064, filed on Jan. 29, 2014.

(51) Int. Cl.
*G02B 5/02* (2006.01)
*F21V 8/00* (2006.01)
*C03C 23/00* (2006.01)

(52) U.S. Cl.
CPC ........ *G02B 6/0041* (2013.01); *C03C 23/0025* (2013.01); *G02B 5/0236* (2013.01); *G02B 5/0268* (2013.01); *G02B 6/0065* (2013.01)

(58) Field of Classification Search
CPC .................................................. C03C 23/0025
See application file for complete search history.

(56) References Cited

U.S. PATENT DOCUMENTS 5,030,594 A * 7/1991 Heithoff .................. C03B 5/187
501/70
5,206,496 A   4/1993 Clement et al.
(Continued)

FOREIGN PATENT DOCUMENTS

CN    1619382 A    5/2005
CN    1786745 A    6/2006
(Continued)

OTHER PUBLICATIONS

Gy et al., "Ion exchange for glass strengthening," Materials Science and Engineering B 149 (2008) 159-165 (Year: 2008).*
(Continued)

*Primary Examiner* — David Sample
(74) *Attorney, Agent, or Firm* — Ryan T. Hardee (57) ABSTRACT

The present disclosure relates to substrates having laser-induced scattering features located either on the surface of the substrate or within the substrate, along with methods of making such scattering substrates. The disclosed scattering substrates provide improved light extraction properties and may be useful in a variety of applications, such as lighting and electronic displays.

16 Claims, 10 Drawing Sheets

(56) References Cited

U.S. PATENT DOCUMENTS

| | | | |
|---|---|---|---|
| 5,637,244 A | 6/1997 | Erokhin | |
| 5,674,790 A | 10/1997 | Araujo | |
| 6,333,486 B1 * | 12/2001 | Troitski | B23K 26/0608 219/121.62 |
| 6,392,683 B1 | 5/2002 | Hayashi | |
| 6,522,373 B1 * | 2/2003 | Hira | G02B 6/0036 362/603 |
| 6,727,460 B2 | 4/2004 | Troitski | |
| 6,768,080 B2 | 7/2004 | Troitski | |
| 6,969,820 B2 | 11/2005 | Hayashi et al. | |
| 7,740,280 B1 | 6/2010 | Moore | |
| 8,304,358 B2 | 11/2012 | Shelestak et al. | |
| 8,547,008 B2 | 10/2013 | Arbab et al. | |
| 9,324,894 B2 | 4/2016 | Dogimont et al. | |
| 2002/0186924 A1 | 12/2002 | Kohnke et al. | |
| 2007/0165976 A1 * | 7/2007 | Arbab | G02B 6/0035 385/4 |
| 2008/0193721 A1 | 8/2008 | Ukelis et al. | |
| 2011/0256344 A1 * | 10/2011 | Ono | C03C 3/076 428/131 |
| 2013/0050992 A1 * | 2/2013 | Schneider | F25D 23/028 362/100 |
| 2013/0247615 A1 * | 9/2013 | Boek | C03C 15/00 65/29.1 |
| 2018/0265399 A1 * | 9/2018 | Hwang | C03B 25/025 |
| 2018/0364415 A1 * | 12/2018 | Shim | C03C 3/091 |

FOREIGN PATENT DOCUMENTS

| | | | |
|---|---|---|---|
| CN | 101462825 A | 6/2009 | |
| CN | 101470230 A | 7/2009 | |
| CN | 101554817 A | 10/2009 | |
| CN | 101867020 A | 10/2010 | |
| CN | 102062893 A | 5/2011 | |
| CN | 102179628 A | 9/2011 | |
| CN | 102219375 A | 10/2011 | |
| CN | 202049254 A | 11/2011 | |
| CN | 202494800 U | 10/2012 | |
| CN | 101545994 B | 11/2012 | |
| EP | 0590511 A1 | 4/1994 | |
| EP | 1533632 A1 | 5/2005 | |
| JP | 2011076790 A | 4/2011 | |
| TW | 200935094 A | 8/2009 | |
| WO | 2013160823 A1 | 10/2013 | |
| WO | WO-2015139929 A1 * | 9/2015 | C03C 23/0025 |

OTHER PUBLICATIONS

Hengfeng, et al., "Study on laser dots marking based on dynamic focusing galvanometer system", Zhongguo Jiguang/Chinese Journal of Lasers, vol. 40, Issue 9, Sep. 2013, Article No. 0903006, pp. 1-6.

Teng, T.C., "A novel feasible digital laser-blastering to fabricate a light-guide-plate of high luminance and efficiency for TV application", IEEE/OSA Journal of Display Technology, vol. 9, Issue 10, 2013, Article No. 6515354, pp. 800-806.

Kalantar, K., "Modified functional light-guide plate for backlighting transmissive LCDs", Journal of the Society for Information Display, 11/4, 2003, pp. 641-645.

Okumura, et al., "Highly-efficient backlight for liquid crystal display having no optical films", Applied Physics Letters, vol. 83, No. 13, (Sep. 29, 2003); doi: 10.1063/1.1613051, pp. 2515-2517.

Kim, et al., "Laser-marking process for liquid-crystal display light guide panel", Proceedings of the Institution of Mechanical Engineers, Part B: Journal of Engineering Manufacture, Jul. 1, 2005, vol. 219: 565-569.

Pan, et al., "Embedded dots inside glass for optical film using UV laser of ultrafast laser pulse", Optics and Lasers in Engineering, 49 (2011) pp. 764-772.

Luo, et al., "Fabrication of glass micro-prisms using ultra-fast laser pulses with chemical etching process", Optics and Lasers in Engineering, 50 (2012) pp. 220-225.

International Search Report and Written Opinion PCT/US2015/013390 dated Apr. 13, 2015.

English Translation of CN2015800065403 Search Report dated Jan. 17, 2018; 2 Pages; Chinese Patent Office.

Baset et al., "Femtosecond laser induced surface swelling in polymethyl methacrylate", Optics Express 21(10), May 20, 2013, pp. 12527-12538.

Grzybowski et al., "Extraordinary laser-induced swelling of oxide glasses", Optics Express 17(7), Mar. 30, 2009, pp. 5058-5068.

* cited by examiner

A – picture element (pixel)
B – primary pixels (red, green, blue)

FIG. 8A
60um Line Spacing

FIG. 8B
70um Line Spacing

LASER FEATURED GLASS FOR DISPLAY ILLUMINATION

CROSS-REFERENCE TO RELATED APPLICATIONS

This application claims the benefit of priority under 35 U.S.C. § 371 of International Patent Application Serial No. PCT/US15/13390, filed on Jan. 29, 2015, which in turn, claims the benefit of priority of U.S. Provisional Patent Application Ser. No. 61/933,064 filed on Jan. 29, 2014, the contents of each of which are relied upon and incorporated herein by reference in their entireties.

FIELD

The present disclosure relates to glass sheets having laser-induced features within the sheet, along with methods of making such glass sheets. The disclosed glass sheets provide improved light extraction properties and may be useful in a variety of applications, such as lighting and electronic displays.

BACKGROUND ART

The demand for new types of electronic displays, such as LCD-based displays, has resulted in a continuing need for improvements to the technologies incorporated into these devices. For example, in conventional LCD backlight units (BLU), light is extracted from the light guide at a high angle and multiple diffusers and turning (brightness enhancing) films are used to achieve the desired angular emission required for the display. These films not only add cost, light loss, and system complexity, but also suffer from a number of material deficiencies that make them less than ideal for electronics. Current polymethylmethacrylate (PMMA) light guides have high transparency, but suffer from poor moldability, which limits use in small devices, and have high moisture absorption, leading to undesirable mechanical performance in large sizes (e.g., warp and material swelling). Other polymers, polycarbonate (PC) and cyclic olefin copolymer (COP), are typically used in handheld devices due to better moldability and less moisture absorption, but suffer from high light attenuation.

Further, even if the material, technological and engineering difficulties of current designs for backlight extraction are overcome, these polymeric materials are not idea for next generation, transparent displays as they are opaque. There is clearly a need for an improved backlight with high transparency which also emits light nearly perpendicular to the light guide as this would not only enable transparent displays, but could also simplify the BLU stack in conventional displays. The disclosed glass sheets provide these advantages and have better attenuation than PC and COP while maintaining good mechanical performance attributes, such as low CTE, low- to no-water absorption, and higher dimensional stability.

SUMMARY

The present disclosure relates to a scattering substrate comprising a substrate having a thickness of from about 0.2 mm to about 3 mm, wherein optionally, the substrate comprises less than 100 ppm of iron compounds, scattering features located within the substrate, wherein the scattering features comprise a modified region of the substrate having a diameter of from about 5 µm to about 100 µm, and the scattering features are located at least about 5 µm apart when measured edge-to-edge of the modified regions of the substrate; and optionally, further comprising one or more of: one or more surface features, one or more polymeric films, one or more inorganic films, or one or more masks or filters. In some embodiments, the substrate comprises a glass or glass ceramic substrate, where the glass or glass ceramic may optionally be chemically or thermally tempered, such as an ion-exchanged glass substrate. In cases where the substrate is a chemically or thermally tempered glass or glass ceramic, the scattering feature may be constrained to the central tension region of the glass substrate.

In some embodiments, the scattering features have a diameter from about 10 µm to about 50 µm. In certain embodiments, the scattering features are located at least about 10 µm apart when measured edge-to-edge of the modified regions of the glass substrate. In some embodiments, the scattering substrate shows a peak viewing angle of from about 40° to about 60° as measured by a imaging sphere/viewing angle instrument. In some embodiments, the substrate has the scattering substrate has an angular color shift for x of about 0.015 and for y of about 0.02 as measured by the CIE 1931 standard.

In some embodiments, the scattering features comprise a modified region of the glass substrate which includes an about 1 µm to about 10 µm diameter melted region and one or more cracks in the proximity of the melted region. In some embodiments, the optional one or more surface features comprise micron, sub-micron, pico-scale, or nanoscale features. In some embodiments, the one or more surface features are in the surface of the glass or on the surface of the glass. Such surface features may be produced via modification of the glass surface or by coating the glass.

A second aspect comprises an electronic device comprising any of the scattering substrates described above. In some embodiments, the device comprises a display. In some embodiments, the display is greater than 60" diagonally.

A third aspect comprises a method of making any of the scattering substrates described above. In some embodiments, the method comprises: a) providing a substrate having a thickness of from about 0.2 mm to about 3 mm wherein optionally, the substrate comprises less than 100 ppm of iron compounds; and b) irradiating the substrate by focusing a pulsed laser in the substrate to form one or more scattering features within the substrate; wherein i) the laser's peak power must be sufficient to form the one or more scattering features; ii) the scattering features are located at least about 10 µm apart when measured edge-to-edge of the modified regions of the substrate; and c) optionally, further comprising one or more of: i) one or more surface features; ii) one or more polymeric films; iii) one or more inorganic films; or iv) one or more masks or filters. The substrate may comprise a glass or glass ceramic, and further, the glass or glass ceramic substrate may be thermally or chemically tempered. Additional features and advantages of the disclosure are set forth in the detailed description that follows, and in part will be readily apparent to those skilled in the art from that description or recognized by practicing the disclosure as described herein, including the detailed description that follows, the claims, and the appended drawings.

The claims as well as the Abstract are incorporated into and constitute part of the Detailed Description set forth below.

All publications, articles, patents, published patent applications and the like cited herein are incorporated by reference herein in their entirety, including U.S. patent application Publication and U.S. Provisional patent applications.

DETAILED DESCRIPTION

The present disclosure can be understood more readily by reference to the following detailed description, drawings, examples, and claims, and their previous and following description. However, before the present compositions, articles, devices, and methods are disclosed and described, it is to be understood that this disclosure is not limited to the specific compositions, articles, devices, and methods disclosed unless otherwise specified, as such can, of course, vary. It is also to be understood that the terminology used herein is for the purpose of describing particular aspects only and is not intended to be limiting.

The following description of the disclosure is provided as an enabling teaching of the disclosure in its currently known embodiments. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein.

Thus, if a class of substituents A, B, and C are disclosed as well as a class of substituents D, E, and F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and/or C; D, E, and/or F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and/or C; D, E, and/or F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

A first aspect comprises a substrate characterized by one or more laser induced scattering features that are present within the substrate. The substrate may be formed of any material that undergoes the necessary laser modification under the described conditions. Materials envisioned as being useful as substrates include glass and glass ceramic substrates, as well as polymers, such as polymethylmethacrylate (PMMA), polycarbonate (PC) and cyclic olefin copolymer (COP). In some cases, the structure and properties of glasses or glass ceramics, such as high melting points and hardnesses, make them better substrates than other materials for the processes described herein.

Generally, while not wanting to be held to a particular theory, the scattering features are formed via a multiphoton absorption process within the substrate. Multiphoton absorption is a nonlinear phenomenon that occurs at very high laser light intensities. As is well known in the art, a material is optically transparent when the energy hv of a photon is lower than the band gap $E_G$ of absorption of the material. Therefore, the condition under which a material becomes absorptive can be described as $hv > E_G$. However, even under optically transparent conditions, absorption can occur in a material if the intensity of the light is made sufficiently high via higher order modes, as described by $nh\nu > E_G$ (n=2, 3, 4, ...). This nonlinear phenomenon is known as multiphoton absorption and in the case of a pulsed laser, the intensity of laser light correlates to the peak power density ($W/cm^2$) of laser light (determined by (energy of laser light per pulse)/(beam spot cross-sectional area of laser light×pulse width)). Alternatively, in the case of a continuous wave, the intensity of laser light is determined by the electric field intensity ($W/cm^2$) of laser light. The substrates comprising scattering features, as described herein, can be formed via multiphoton absorption processes, wherein one or more lasers are focused into the substrate to generate optical damage within the substrate. This optical damage induces distortion within the substrate, thereby forming a scattering feature.

Lasers useful for forming the scattering features described herein include pulsed laser systems that provide sufficient peak power to initiate multiphoton processes in the substrate. Typically, for the processes described herein, pulsed nanosecond lasers are used, however in some cases, use of picosecond or femtosecond pulsed lasers may prove advantageous. In some embodiments, the laser pulse energy may be from about 0.1 µJ/pulse to about 1 mJ/pulse, or about 1 µJ/pulse to about 1 mJ/pulse. The focal size is typically from about ~1 µm to about 10 µm in diameter and 10-500 µm in length, but can be modified as necessary. The wavelength of the light can be anywhere from about 300 nm to about 3000 nm. In some embodiments, the laser wavelength is chosen to either avoid causing colored spots or features or to specifically cause coloring of the substrate, particularly glass substrates. Such color formation is possible with UV light (typically at wavelengths below 350 nm) with glasses containing certain compounds, such as iron compounds. In some instances, coloring may be advantageous for modifying color output. Alternatively, where the goal is to optimize white light output, the goal would be to avoid introduction of color features in the glass.

Figure 1:
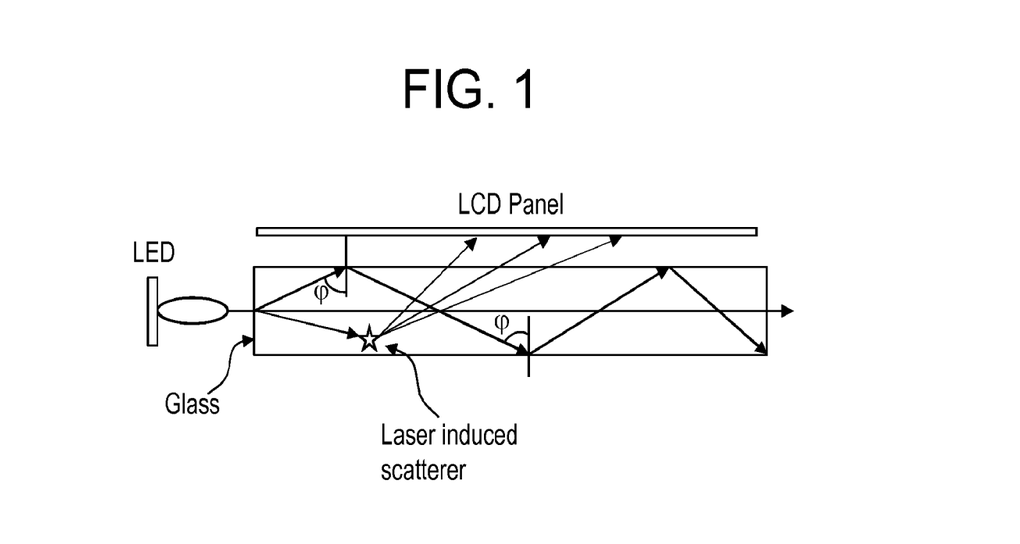
FIG. 1 is a schematic of light extraction due to a laser induced scattering feature in the bulk of the substrate.

FIG. 1 pictorally describes an example of a substrate with a light scattering feature. The substrate is side lit by a light emitting diode (LED), which, due to the high angle of incidence, provides light that is primarily channeled through the substrate via total internal reflection. However, as shown, when the light from the LED interacts with the scattering feature, the light is scattered at a variety of angles, and is able to act as a backlight for the liquid crystal display shown above the substrate.

Figure 10:
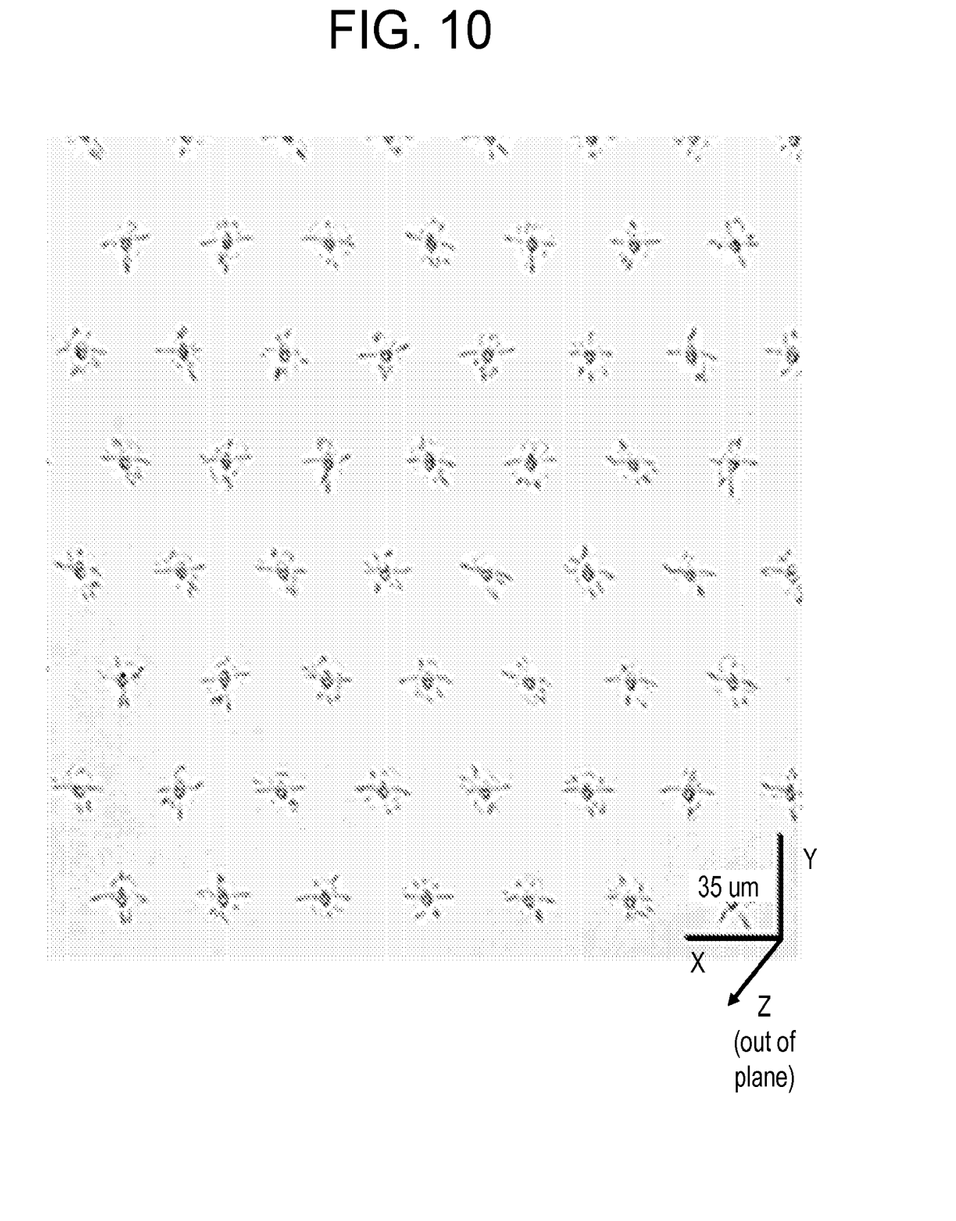
FIG. 10 is an optical microscope image of the scattering features. Each feature is composed of a 2-3 µm diameter feature surrounded by radial micro "cracks."

The scattering features comprise a modified region of the substrate that can incorporate micro cracks, substrate that has melted and re-solidified, substrate that has undergone a phase change, substrate that has undergone a compositional change, substrate that has changed amorphous or crystalline structure, or combinations thereof. In some embodiments, the scattering feature comprises a melted, tube-like region (when viewed in plane with or parallel to the substrate, plane XZ or YZ in FIG. 10) surrounded by radial micro cracks (FIG. 10). The scattering features can be described as having a diameter, wherein the diameter describes the roughly circular area of the substrate modified by the laser when the substrate is viewed from the top-down (i.e., orthogonal to the largest dimensions, plane XY in FIG. 10). The scattering features can have a diameter from about 5 µm to about 150 µm, about 10 µm to about 120 µm, about 10 µm to about 100 µm, or about 20 µm to about 80 µm. In the case where the scattering feature comprises a melted, tube-like region surrounded by radial micro cracks, the tube-like region may have a diameter of from about 1 µm to about 20 µm or about 3 µm to about 10 µm and the scattering feature (the tube-like region and the micro cracks) can have a diameter from about 10 µm to about 120 µm. In some embodiments, the scattering features have a diameter of about 10, 20, 30, 40, 50, 60, 70, 80, 90, or 100 µm.

As noted above, the process of forming scattering features can rely on nonlinear optical methods, such as multiphoton absorption by the substrate. Because the substrate is transparent to the laser's first order mode, it is possible to focus the beam in the substrate itself and form the scattering features within the substrate. While it is possible to place the scattering features on one or both surfaces of the substrate, some embodiments incorporate the scattering features into the substrate itself. In some embodiments wherein the laser is focused inside the substrate, the laser energy, power, pulse width or peak power can be selected such that the modified region is formed only within the substrate and does not reach or cause damage to the surface of the substrate. In such embodiments, because the laser is focused down through a waist, the scattering features when viewed in plane with the substrate may have a tube-like or more square or rectangular cross section. The length of the area of the substrate affected when view in the XZ or YZ plane of FIG. 10 is from about 5 µm to about 150 µm, about 10 µm to about 120 µm, about 10 µm to about 100 µm, or about 20 µm to about 80 µm. In some embodiments, the scattering features have a diameter of about 10, 20, 30, 40, 50, 60, 70, 80, 90, or 100 µm.

The substrate is generally a sheet having two dimensions (e.g., X and Y) much larger than the third dimension (Z). Such substrates can have a thickness, Z, of any useful value. For many applications, it is desirable to make the substrate as thin as possible for aesthetics, weight reduction, and cost. However, as the substrate gets thinner, it is generally more susceptible to breakage. Therefore, there is a strong demand for substrates that are thin, but still retain sufficient strength to avoid undergoing breakage during use. In this regard, glass and polymer can have different structural advantages—the polymers often being less likely to break, but having less structural rigidity and strength. In some embodiments, the substrate has a thickness of from about 3 mm to about 0.2 mm, about 2 mm to about 0.5 mm, or about 1 mm to about 0.7 mm. In some embodiments, the substrate has a thickness of about 0.1, 0.2, 0.3, 0.4, 0.5, 0.6, 0.7, 0.8, 0.9, 1, 2, or 3 mm.

In the case of a glass substrate, glass compositions that may be used generally comprise any composition that can be formed into a sheet by methods known in the art, including float, and fusion or other draw processes. Of particular use are alkali aluminosilicate glasses, such as Corning Incorporated's GORILLA GLASS®, or display glasses, such as Corning Incorporated's EAGLE XG®.

Because of the desire for strength, the glass substrate may be chemically or thermally tempered prior to undergoing incorporation of the scattering centers. Glasses like Corning Incorporated's GORILLA GLASS® can be chemically tempered via ion-exchange techniques known in the art (see, e.g., U.S. Pat. No. 5,674,790, herein incorporated by reference in its entirety). In the case where an ion-exchanged glass substrate is used, it may be advantageous to place the scattering features in the central tension region of the glass. In some embodiments, the scattering features are located within the central ⅓ of the glass substrate. In some embodiments, the scattering features are located within the central ⅕ of the glass substrate.

Figure 11:
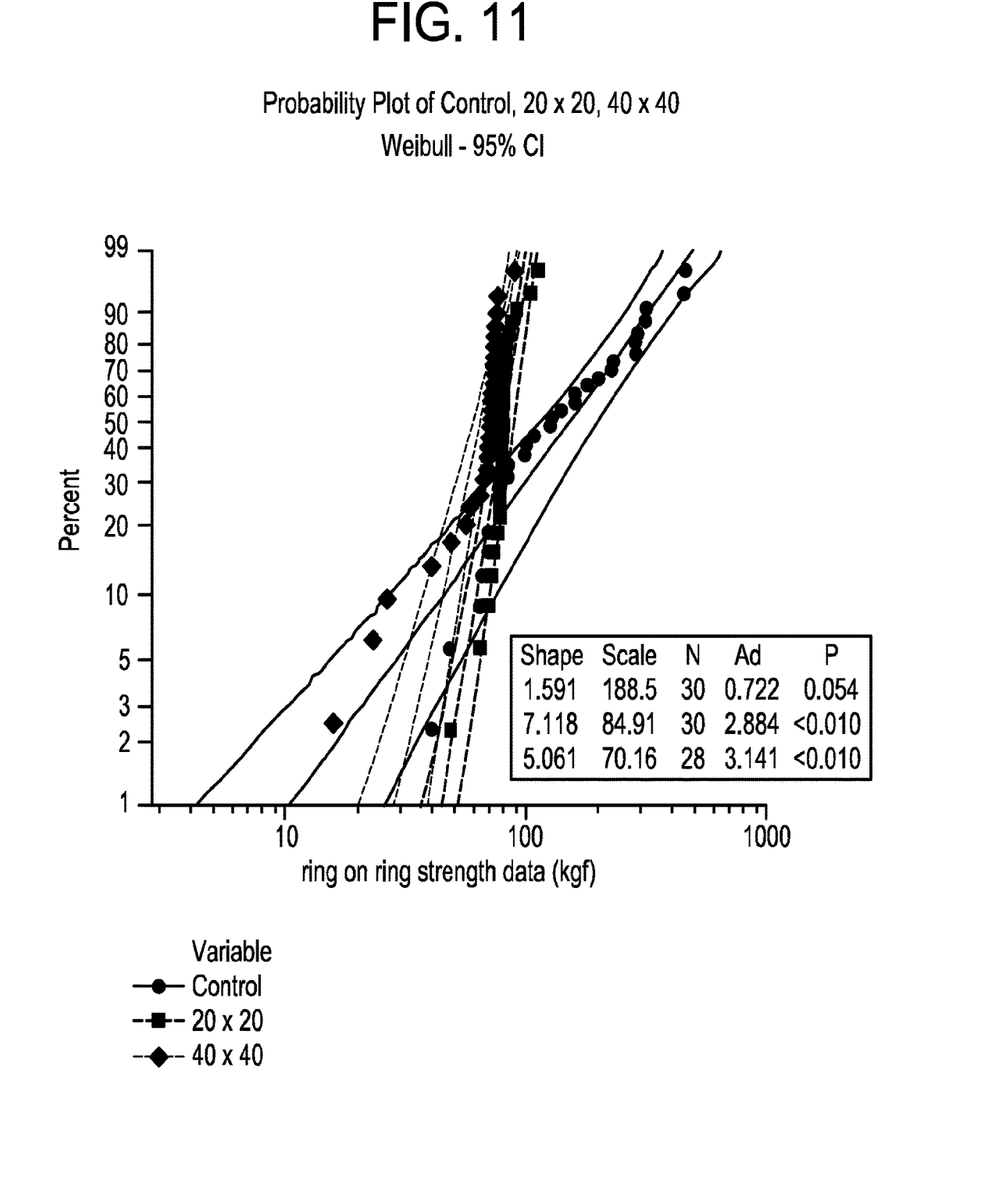
FIG. 11 shows ring on ring (ROR) strength testing of glasses having scattering features (20 µm×20 µm and 40 µm×40 µm) as compared to a control glass with no features. Thirty samples of each were made on 2"×2" glass substrates. The increased shape values in the test results show a strong single mode of failure, and indicate an approximately 50% reduction in strength.

Incorporation of the scattering features into the glass substrate can cause a decrease in the overall strength of the glass. This strength reduction can be factored in when choosing glass type and whether tempered glass should be considered for the application. One example of the decrease in glass strength is shown in FIG. 11, which shows that the non-ion exchanged alkali aluminosilicate glass substrate tested had an approximately 50% reduction in strength with a single failure mode operating. Further details of the experiment are described below in Example 5.

Patterning of the scattering features in the substrate can be in any formation, such as arrays, geometrics, random, etc. Patterns can be formed by translating either the laser or the laser beam, the substrate, or both, either manually or more efficiently via computer-aided techniques—techniques all well known by one of skill in the art. Placement or patterning of the scattering features on the substrate is only practically limited by the need that the scattering centers are sufficiently far apart to avoid causing substantial likelihood of crack propagation from one scattering feature to another. In some embodiments, the scattering features are from about 5 μm to about 2 mm apart (edge-to-edge of scattering features). In some embodiments, the scattering features are about 5, 10, 15, 20, 25, 30, 40, 50, 60, 70, 80, 100, 150, 200, 500, 1000, 2000 μm apart (edge-to-edge of scattering features). TABLE 1 shows the density of scattering centers that can be obtained as a function of the spacing of the features.

TABLE 1

| X | Y | Density (per cm$^2$) |
|---|---|---|
| 10 μm | 10 μm | 1,000,000 |
| 10 μm | 20 μm | 500,000 |
| 10 μm | 30 μm | 333,333 |
| 10 μm | 40 μm | 250,000 |
| 10 μm | 50 μm | 200,000 |
| 10 μm | 60 μm | 166,667 |
| 10 μm | 70 μm | 142,857 |
| 10 μm | 80 μm | 125,000 |
| 10 μm | 90 μm | 111,111 |
| 10 μm | 100 μm | 100,000 |

Figure 2:
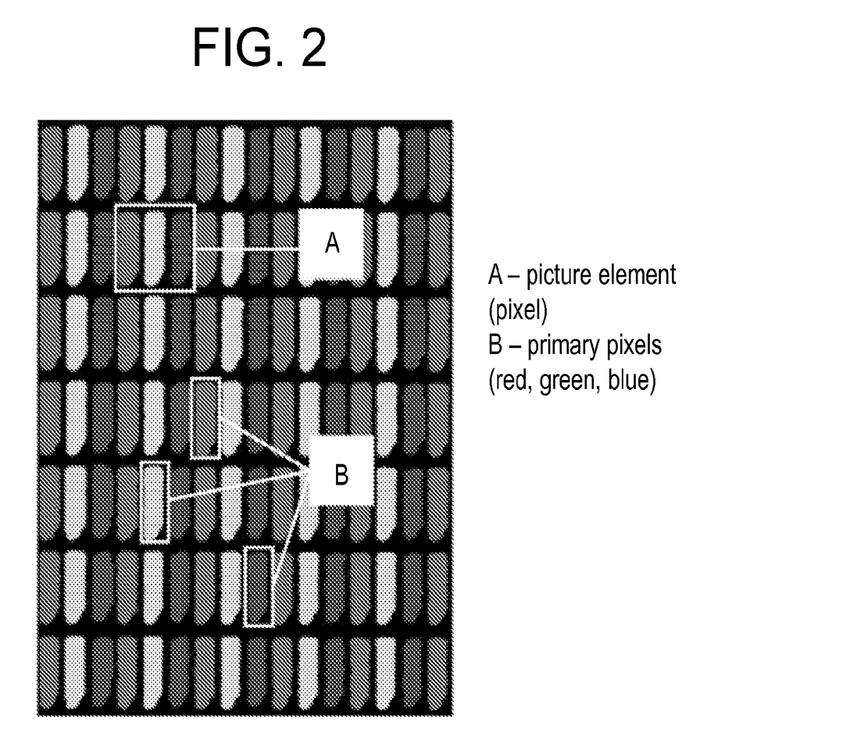
FIG. 2 is an example of a pixel structure in an LCD panel. The black matrix area blocks up to 70% of the light incident from the backlight.

FIG. 2 shows an example of a LCD color array. The array comprises picture element ("A") that comprise red, green and blue pixels ("B"). Additionally, the pixels are separated by a black grid that in traditional backlight applications can block or absorb as much as 70% of the incident light. By placing the scattering features in alignment with the transparent RGB sub-pixels, more light is transmitted because the light emitted by each individual extraction feature illuminates a specific RGB sub-pixel directly. This precise placement of the scattering features increases lighting efficiency by minimizing the extracted light blocked by boundary regions, which translates directly to lowering energy consumption and/or battery life in a display device.

Figure 6:
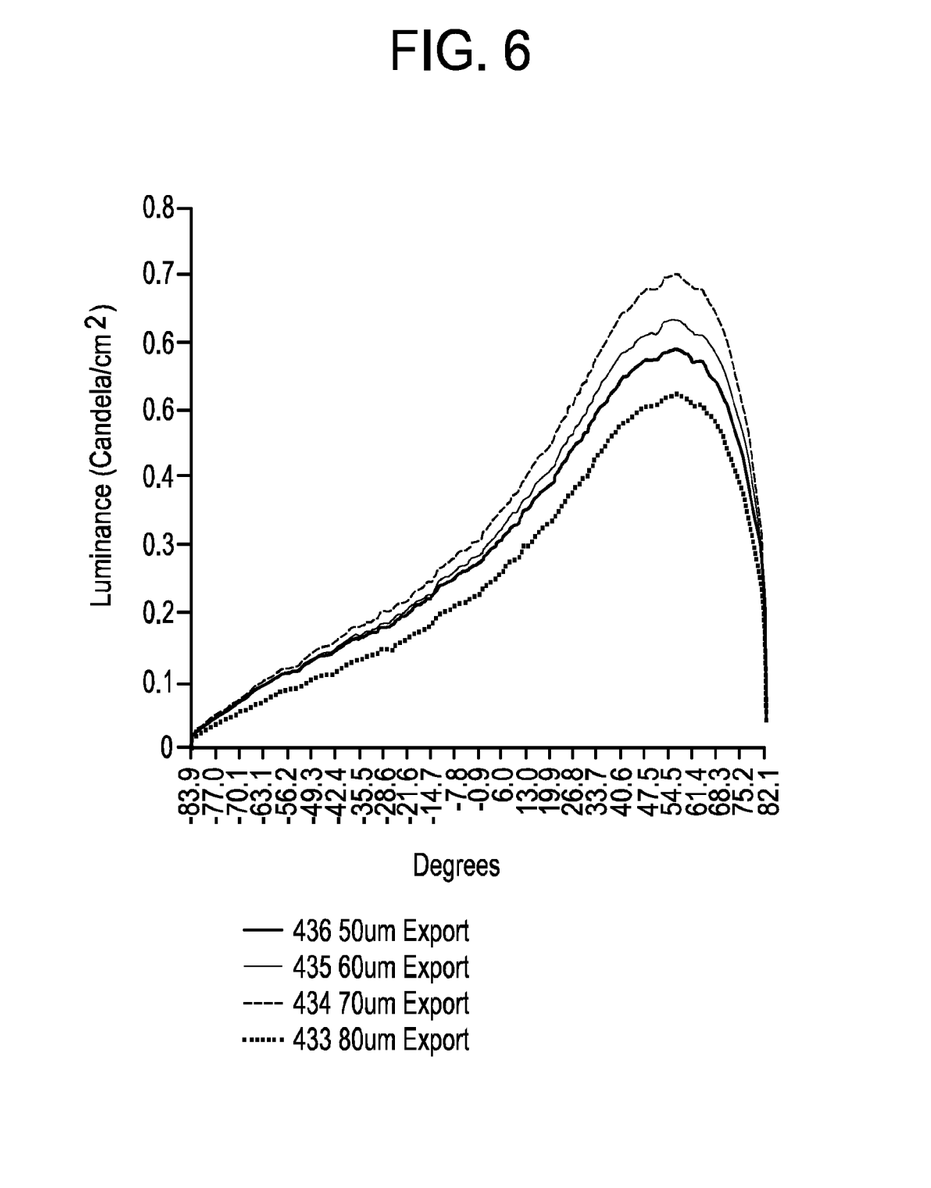
FIG. 6 compares luminescence with viewing angle at four different scattering feature spacings (50, 60, 70, and 80 µm). Peak intensity occurred in all cases at about 55 degrees. Luminescence varied by spacing due to feature density and distance from edge.
Figure 7:
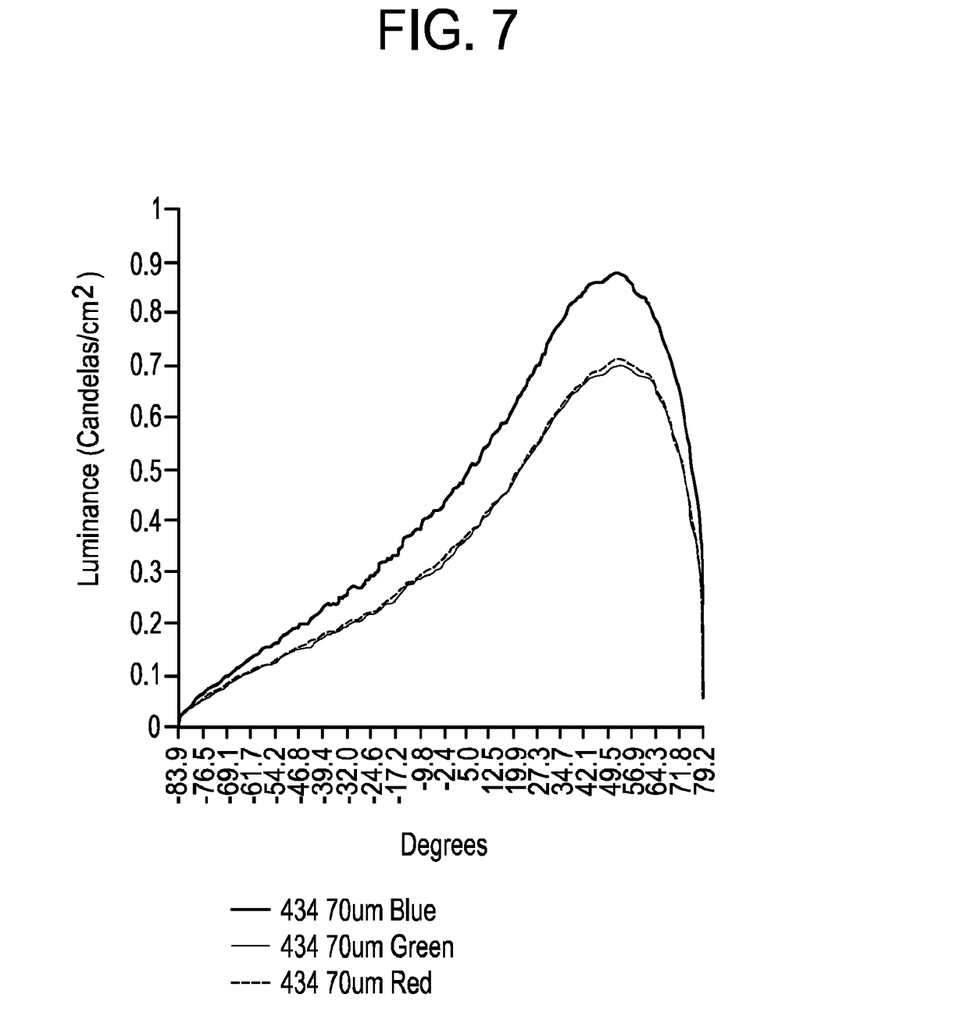
FIG. 7 shows the luminescence of red, green and blue colors as a function of viewing angle. Measurements were taken at a 10 µm by 70 µm feature spacing. The graph shows that the viewing angle is consistent between colors.

The scattering substrate formed by the incorporation of scattering features into the substrate shows a number of advantages over alternative methods of extracting light from a substrate. First, light is extracted at a higher angle than conventional patterned backlight unit (BLU) light guides and other etching processes in traditional processes (FIGS. 6 and 7, described below). Additionally, the laser-induced features are created directly in the substrate whereas other techniques involve applying an ink or polymer layer to the glass, which would normally contain the pattern. Accordingly, the substrate can in some embodiments be produced without a separate light extraction layer of material applied to the substrate. In the case where the substrate is a glass substrate, patterning in the glass substrate preserves the attributes of an all-glass system: (1) low roughness of fusion-drawn glass surface; (2) low H$_2$O absorption; (3) low CTE and no CTE mismatch issues; (4) high dimensional stability; (5) higher stiffness; (6) higher T$_g$; and (7) low thickness variation.

In another aspect, the scattering substrate can be incorporated as a backlight into an electronic device, such as a tablet, smart phone, or television or computer display. In such embodiments, the scattering substrate may incorporate one or more further modifications to improve its applicability.

In some circumstances or array structures, the light scattering features may produce "lining" or lines of brighter and darker areas in a display. In order to correct for this lining, one or both of the surfaces of the scattering substrate may be modified. These modifications can include, for example, one or more polymer or inorganic films, polymer or inorganic masks, or texturing, modifying, or roughening the surface of the substrate. In the case of scattering substrate surface modifications, some embodiments involve the formation of a sub-micron structured surface having features on the nano- or picometer scale. In some embodiments, the scattering substrate further comprises a nanostructured surface that provides additional light scattering properties. These features may be formed by any process known in the art, including negative or removal processes such as etching, and positive or additive processes like coating. Further, these features may be randomly place on the surface or may be placed in an organized or arrayed manner to complement the scattering features in the glass.

In some embodiments, the glass composition can play a role in the color composition of the scattered light. This is particularly important in large displays where uneven color scattering can cause changes in the color of the output light as a function of distance from the input LEDs. In the embodiments where color composition is critical, the glass substrate can be chosen to minimize compounds in it that absorb in the near-visible region. Such compounds include, but aren't limited to, iron compounds, sulfur compounds, manganese compounds, copper compounds, nickel compounds, chromium compounds, etc.

When used as a backlight in display applications, light that is injected into the substrate may travel through a significant amount of material before being scattered out the face of the scattering substrate. In some cases, it is advantageous to choose a glass composition that minimizes light absorption. In such cases, a glass substrate that has very low concentrations of transition metals, such as iron and chromium, can provide superior transmission. In some embodiments, the glass substrate comprises a low-iron glass, and in some embodiments, the glass comprises less than 50 ppm iron oxides, or less than 20 ppm iron oxides, such as FeO and Fe$_2$O$_3$.

EXAMPLES

Example 1

Laser-induced light scattering features described herein are created using a nanosecond pulsed Nd:YAG laser at 355 nm. The laser is focused to a 2-3 μm spot size inside a non-ion exchanged alkali aluminosilicate glass using an effective focal distance of 30 mm to create a damage spot within the glass which scatters light. While a non-ion exchanged alkali aluminosilicate glass was used in the experiments, the absorption of the glass is irrelevant to this process, allowing any glass that allows internal focusing to be used. At the focus, nearly all of the power of each pulse of the laser is absorbed by the glass to form what appears to be a tubular, melted region approximately 2-3 µm in diameter. In some examples, the intensity of the laser is such that in addition to the formation of a melted region, a region of high stress and dislocated glass is formed in the surrounding glass structure. This stress can cause the formation of radial "microcracks" around the tube in all directions (see FIG. 10, wherein the microcracks are approximately 20 µm).

Figure 4:
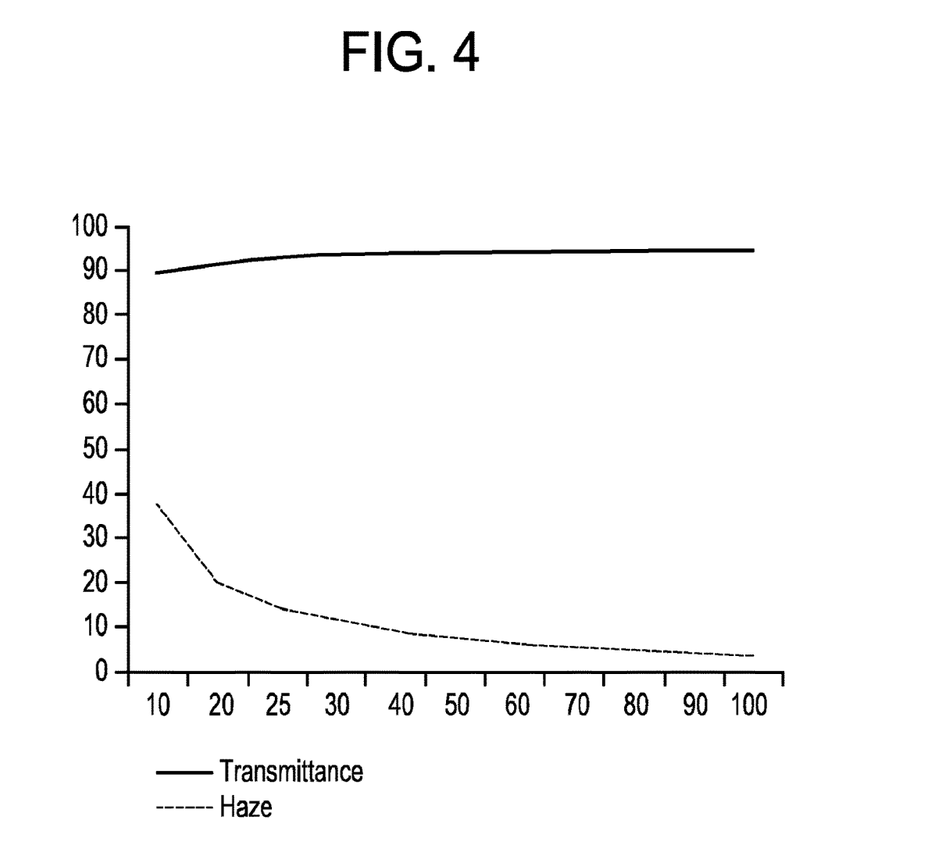
FIG. 4 graphically shows how haze and transmittance correlate to spacing of the laser induced scattering features.

Interestingly, while highly scattering when illuminated, the scattering features are nearly transparent when not illuminated and further, create a minimal amount of haze when not illuminated. This is shown in FIG. 4, which compares haze (Y-axis) and transmittance (Y-axis) to scattering feature spacing (X-axis), and TABLE 2, below.

TABLE 2

| Scattering Feature Spacing (µm) | Transmittance (%) | Haze (%) |
| --- | --- | --- |
| 10 | 89.5 | 37.3 |
| 20 | 91.3 | 20.2 |
| 25 | 92.8 | 14.3 |
| 30 | 93.3 | 11.7 |
| 40 | 93.7 | 9.0 |
| 50 | 94.0 | 7.4 |
| 60 | 94.1 | 6.3 |
| 70 | 94.3 | 5.4 |
| 80 | 94.4 | 4.7 |
| 90 | 94.5 | 4.2 |
| 100 | 94.6 | 3.8 |

Example 2

Figure 3:
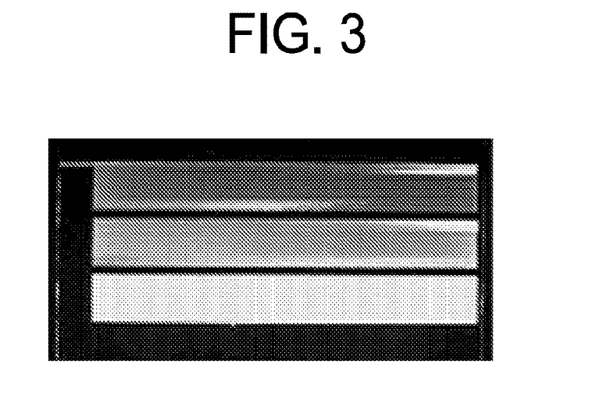
FIG. 3 is a comparison study of the depth of feature and pulse energy. The image is illuminated with an LED in an edge lighting configuration to show light extraction. The three regions are made using different pulse energy. There are five bands in each region made by focusing at different depths; Back Surface (top), ¾ depth into glass, ½ depth into glass, ¼ depth into glass, Front Surface (bottom)

Scattering features are placed 10 µm×100 µm apart on the back surface of the substrate, ¾ depth into glass, ½ depth into glass, ¼ depth into glass, and on the front surface (FIG. 3) to show the effect that proximity to the surface has on light extraction. Three 0.7 mm scattering substrates are made with different pulse energies (from top to bottom in FIG. 3, 150 mW, 200 mW, and 400 mW) and, as noted, five different depths (back surface (top of substrates shown in FIG. 3), 525 µm deep, 350 µm, 175 µm, front surface (bottom of substrates shown in FIG. 3)).

Example 3

Figure 5:
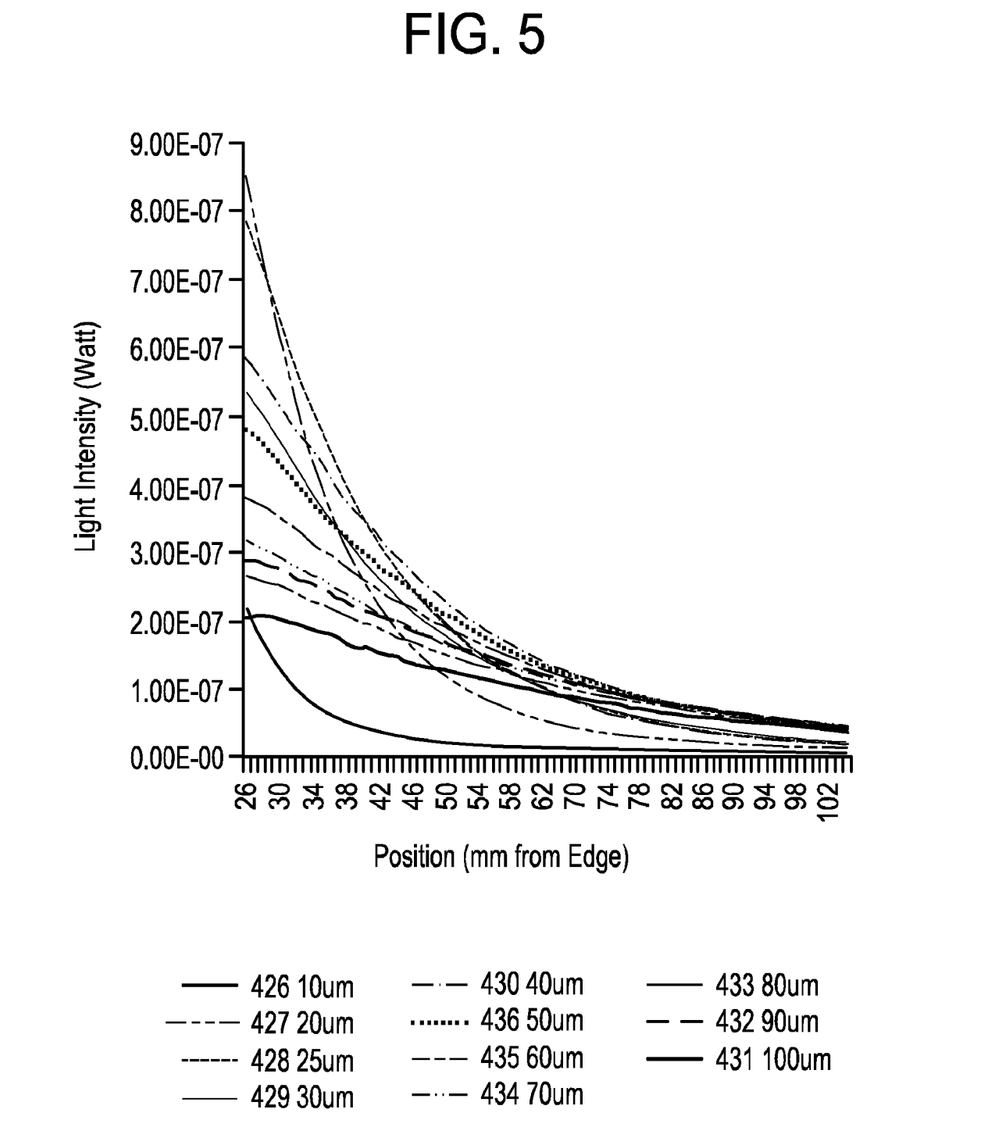
FIG. 5 compares light extraction at 90° with position and with spacing of scattering features.

Attenuation measurements are taken by injecting light into the edge of the glass and then measuring the amount of radiation coming out at 90° versus the distance from the light injection point. At the highest density of features (10 µm×10 µm, 1,000,000 per cm²), all of the light is extracted by ~50 mm into the glass. The next dense sample (20 µm×10 µm, 500,000 per cm²) extracts all of the light by ~80 mm into the glass. As the density dropped, the amount of light extracted near the light injection edge of the glass decreases, while the amount of light available farther from the edge of the glass increases (see FIG. 5, which shows 10, 20, 25, 30, 40, 50, 60, 70, 80, 90, and 100 µm×10 µm densities of scattering features plotted as light intensity (W) versus position from the light injection edge in millimeters (mm)). Such extraction rates can be used to determine the correct density gradient required for uniform illumination for single- or dual-sided light injection or other desired patterning.

Figure 9:
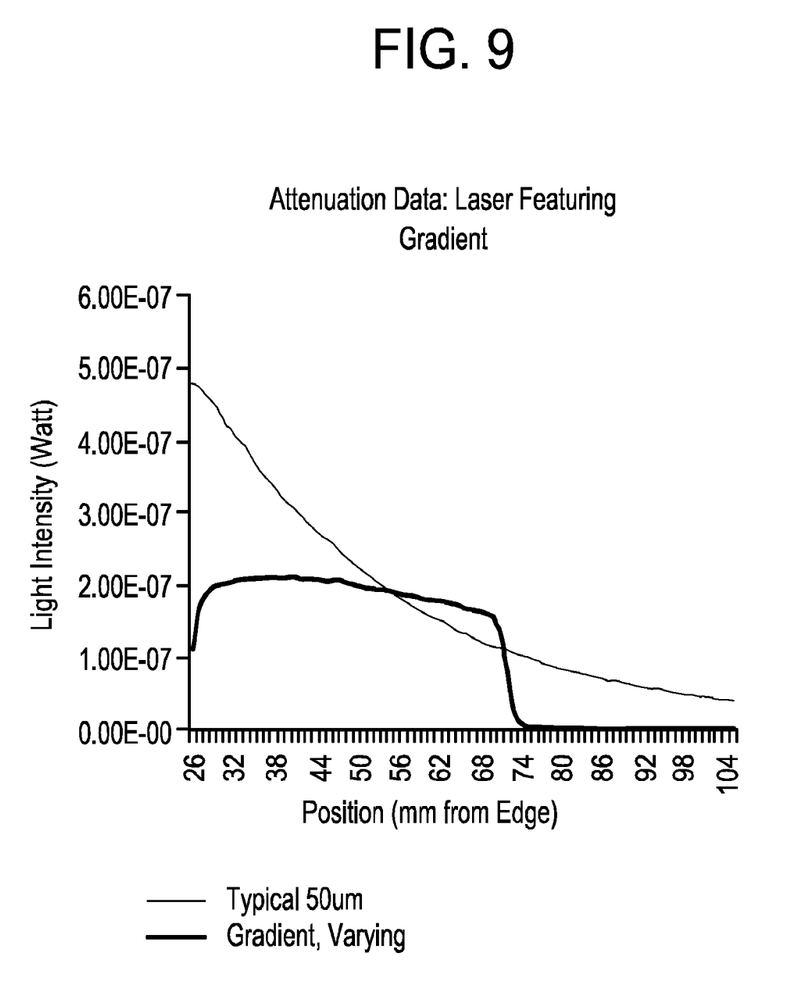
FIG. 9 is a plot showing light extraction of across glass sample wherein a portion of the sample included and area with laser-produced features with gradient spacing, and depicting a nearly flat extraction rate across the featured area.

Based on attenuation data, a gradient of features can be setup to extract an even amount of light across a 2"×2" area of 0.7 non-ion exchanged alkali aluminosilicate glass. Attenuation data is collected from the sample to show a nearly even gradient of light extraction. Feature density starts at 207,000 points/cm² at the light injection edge and ends at 73,000 points/cm² at the far edge. Attenuation data is collected from the sample to show a nearly even gradient of light extraction (FIG. 9). The gradient of light extraction can be affected by either point density or laser power, as noted above.

Example 4

Viewing angle and luminance (FIGS. 6 and 7), and color shift (FIGS. 8A and 8B) are measured using a Radiant ZEMAX IS/VA™ (Imaging Sphere/Viewing Angle) instrument. The imaging sphere is a coated, diffuse, low-reflective hemisphere with a CCD-based photometer or colorimeter on the hemisphere and facing a convex mirror on the base of the sphere next to an illumination source (e.g., an LED, scattering substrate, etc.). The source illuminates the interior surface of the hemisphere, and the mirror allows the detector to view essentially all of the 2π steradian output.

Figure 8A:
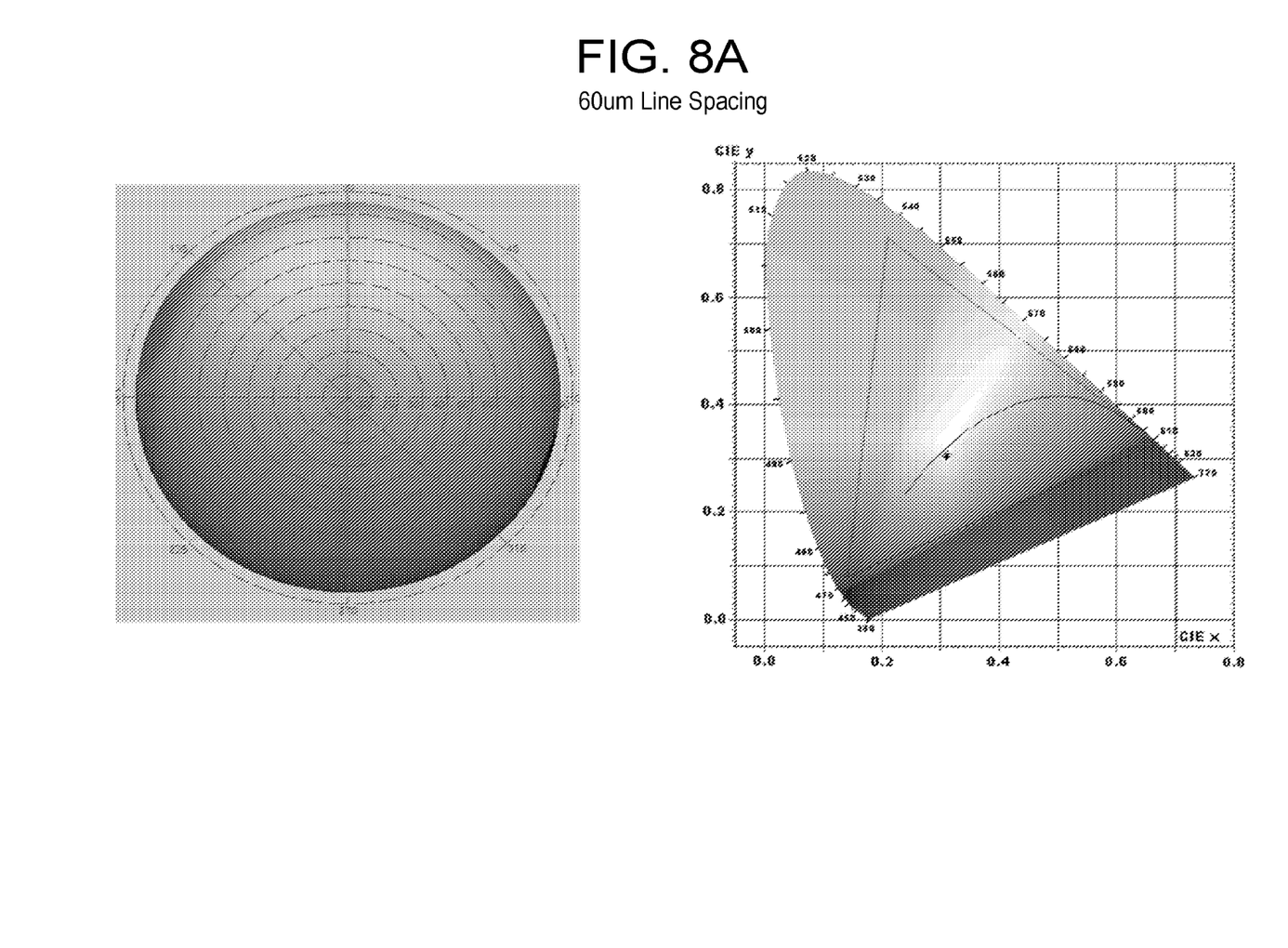
FIGS. 8A and 8B are plots of the color space for light extracted from the scattering center-containing glass sheet. The 10 µm by 60 µm spacing (FIG. 8A) and 10 µm by 70 µm spacing (FIG. 8B) samples are illustrated. Multiple random points around the viewing angle diagram were sampled to produce a small range on the color space chromaticity diagram. The placement of the x's on the chart indicate white light extraction values.
Figure 8B:
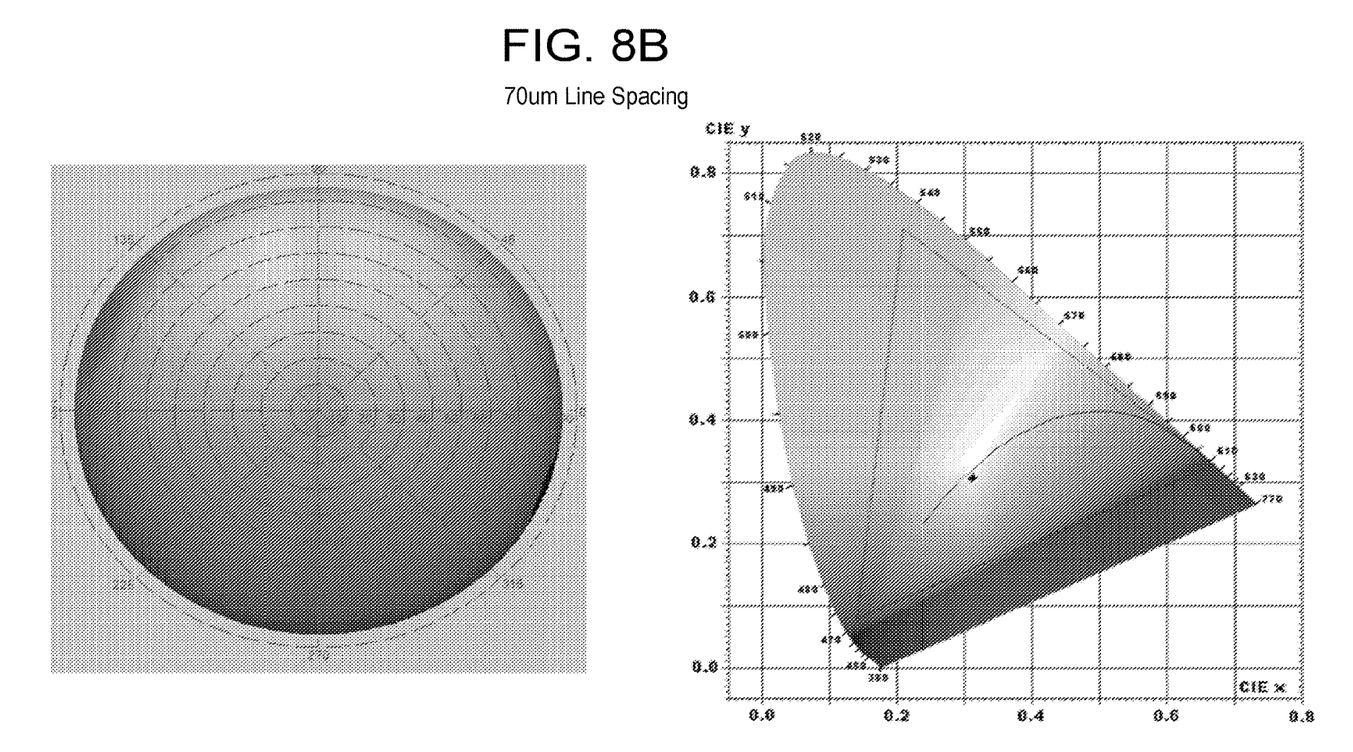

Using a Radiant ZEMAX IS/VA™ instrument, example scattering substrates show a maximum viewing angle of approximately 57 degrees, with a maximum of 0.7 Cd/cm² (7000 Nits) (FIG. 6). Luminance measurements are taken for red, green, and blue individually (FIG. 7). Color shift is calculated manually using CIE tristimulus calculations and graphically illustrated using tristimulus values for 60 and 70 µm scattering feature spacings (FIGS. 8A and 8B, respectively). CIE 1931 x-values range from 0.310 to 0.314, well within industrial guidelines of 0.313+/−0.005. CIE 1931 y-values range from 0.306 to 0.309, slightly below industrial guidelines of 0.329+/−0.005. However, the actual amount of red, green, and blue light emitted from a display is typically corrected by a color mask.

Example 5

Glass substrate strength is impacted by the laser-featuring process as shown in ring-on-ring strength testing of featured 0.7 mm non-ion exchanged alkali aluminosilicate glass (FIG. 11). The shape value increases from 1.591 for control samples to 7.118 for 20 µm×20 µm spaced features and 5.061 for 40 µm×40 µm spaced features, indicating a single mode of cracking. The scale value decreases from 188.5 for control samples to 84.91 for 20 µm×20 µm spaced features and 70.16 for 40 µm×40 µm spaced features, indicating more than a 50 percent drop in strength. While these values seem to indicate a significant strength drop, glass used internally as a backlight unit in a display device and contained within a mechanical structure would likely have reduced strength requirements versus a cover glass. Additional efforts, such as tempering, could be utilized to increase the strength of the samples after creating the scattering sites and thus this strength reduction might be ameliorated with post processing.

Example 6

Low-loss, highly transparent glasses (e.g., ultra low-iron glasses e.g., less than 50 ppm or less than 20 ppm iron oxides), are ideal for scattering substrate applications, due to their high transmittance with less color shift. However, measuring the loss in such glasses can be a challenge, especially where the substrate has been modified with laser-induced features. In the case of a scattering substrate comprising a sheet having two faces and at least two, opposite edges, it is possible to measure the loss via the following process:

1) take a collimated, supercontinuum laser source and split the beam into a reference beam and an experimental beam. The reference beam is sent to an integrating sphere coupled to a spectrograph to use as a reference on the source spectral shape. The experimental beam (still collimated) is sent through the thin edge of the scattering substrate through a place in the substrate where no scattering features are present and emerges from the opposite edge of the substrate. The path length can be the entire substrate or can be a "coupon" or subsection of the glass, such as 500 mm of the substrate. The emerging beam is coupled into a second integrating sphere coupled to a second spectrograph;

2) The ratio of the intensity as a function of wavelength obtained from the reference and experimental beams provides an in-glass signal measurement. The wavelength range can be over the entire range of the laser, or can be directed to a sub-region, e.g., 450-800 nm.

3) Rotate the sample 90 degrees and send the experimental beam travels through one face of the substrate and out the second face (again, where no scattering features are present) and couple into the second integrating sphere coupled to the second spectrograph. Repeat step 2) to provide a thru-glass signal measurement;

4) The ratio of the in-glass signal to the thru-glass signal provides a measure of the loss due to the path and compensates for the reflective surfaces of the glass; and 5) The loss in dB can be computed from the ratio calculated in 4) and the transmission can be determined from the loss. The loss can be calculated in dB/meter (assuming distance measurements are made in meters), for example, according to the equation: $-10\,\mathrm{Log}$(in-glass signal intensity/thru-glass signal intensity)/(propagation distance for the in-glass signal–the propagation distance for the thru-glass signal). The transmission coefficient in percent through 500 mm can be calculated for example, using the equation $100 \cdot 10^{-(loss\ in\ dB/meter)/20}$.

Low-loss glass scattering substrates can have transmissions of greater than 90, 92, 94, or 96% when measured using the above process.

Although the embodiments herein have been described with reference to particular aspects and features, it is to be understood that these embodiments are merely illustrative of desired principles and applications. It is therefore to be understood that numerous modifications may be made to the illustrative embodiments and that other arrangements may be devised without departing from the spirit and scope of the appended claims.

What is claimed is:

1. A scattering substrate comprising:
   a. an ion-exchanged glass substrate having a thickness of from about 0.2 mm to about 3 mm, wherein the substrate comprises less than 100 ppm of iron-containing compounds;
   b. scattering features located within a central tension region of the substrate, wherein:
      i) the scattering features comprise a modified region of the substrate having a diameter of from about 5 μm to about 100 μm; and
      ii) the scattering features are located at least about 5 μm apart when measured edge-to-edge of the modified region of the substrate; and
   c. optionally, further comprising one or more of:
      i) one or more surface features;
      ii) one or more polymeric films;
      iii) one or more inorganic films; or
      iv) one or more masks or filters.

2. The scattering substrate of claim 1, wherein the scattering features have a diameter from about 10 μm to about 50 μm.

3. The scattering substrate of claim 1, wherein the scattering features are located at least about 10 μm apart when measured edge-to-edge of the modified region of the glass substrate.

4. The scattering substrate of claim 1, wherein the scattering substrate shows a peak viewing angle of from about 40° to about 60° as measured by an imaging sphere and/or a viewing angle instrument.

5. The scattering substrate of claim 1, wherein the scattering substrate has an angular color shift for x of about 0.015 and for y of about 0.02 as measured by the CIE 1931 standard.

6. The scattering substrate of claim 1, wherein the scattering features comprise a modified region of the substrate which includes an about 1 μm to about 10 μm diameter melted region and one or more cracks in the proximity of the melted region.

7. The scattering substrate of claim 1, wherein the scattering features comprise a modified region of the substrate which includes an about 1 μm to about 10 μm diameter void region wherein a void in the substrate has been created, and one or more cracks in the proximity of the void region.

8. The scattering substrate of claim 1, wherein the scattering substrate comprises one or more surface features chosen from micron, sub-micron, or nanoscale features.

9. The scattering substrate of claim 8, wherein the one or more surface features are in the substrate or on the surface of the substrate.

10. The scattering substrate of claim 1, wherein the substrate comprises less than 50 ppm of iron-containing compounds.

11. The scattering substrate of claim 10, wherein the substrate comprises less than 20 ppm of iron oxides.

12. The scattering substrate of claim 10, wherein the substrate has a transmission of greater than 90% from 450 nm to 800 nm when the measured path length is 500 mm.

13. An electronic device comprising the scattering substrate of claim 1.

14. The electronic device of claim 13, wherein the device comprises a display having at least one of a width to height in a ratio of from about 4:3 to about 16:9 and a diagonal length of 55" or greater.

15. The scattering substrate of claim 1, wherein the scattering features comprise a modified region of the substrate which includes (A) a melted tube-like region having a diameter of from about 1 μm to about 10 μm and a length of from about 20 μm to about 150 μm and (B) a plurality of microcracks disposed radially around the melted tube-like region.

16. A method of forming the scattering substrate of claim 1, comprising:
   a) providing an ion-exchanged glass substrate having a thickness of from about 0.2 mm to about 3 mm wherein the substrate comprises less than 100 ppm of iron-containing compounds; and
   b) irradiating the glass substrate by focusing a pulsed laser in the substrate to form one or more scattering features within a central tension region of the substrate; wherein
      i) the laser's peak power is sufficient to form the one or more scattering features;

ii) the scattering features are located at least about 5 μm apart when measured edge-to-edge of the modified region of the substrate; and c) optionally, further providing one or more of:
  i) one or more surface features;
  ii) one or more polymeric films;
  iii) one or more inorganic films; or
  iv) one or more masks or filters.

* * * * *